Dec. 30, 1952 W. L. CARLSON 2,624,000

ANTENNA SYSTEM

Filed May 3, 1946

INVENTOR
Wendell L. Carlson
BY H. S. Grover
ATTORNEY

Patented Dec. 30, 1952

2,624,000

UNITED STATES PATENT OFFICE 2,624,000

ANTENNA SYSTEM

Wendell L. Carlson, Princeton, N. J., assignor to Radio Corporation of America, a corporation of Delaware Application May 3, 1946, Serial No. 666,906

1 Claim. (Cl. 250—33)

The present invention relates to short wave antennas and more particularly to broad band antenna systems adapted to be used with television receivers.

An object of the present invention is to improve the band width of television receiving antennas.

Another object of the present invention is the provision of a simple television receiving antenna system which may be used over the entire television band without requiring tuning.

Still another object of the present invention is the provision of a simple, inexpensive, lightweight television receiving antenna system.

A further object of the present invention is to reduce losses in the transmission line coupling the television receiving antenna to the receiver.

Still a further object of the present invention is to provide means for increasing the average response of a dipole antenna over a wide frequency range.

The foregoing objects and others which may appear from the following detailed description are attained by coupling one end of a high impedance transmission line to the adjacent ends of a dipole antenna comprising a pair of linear conductors in an end-to-end relationship. The antenna itself is preferably situated in an elevated location broad side to the desired direction of reception. At the other end of the transmission line a simple resistance pad may be used to match the impedance of the transmission line to the input impedance of the receiver input terminals.

Figures 1, 2, 3:
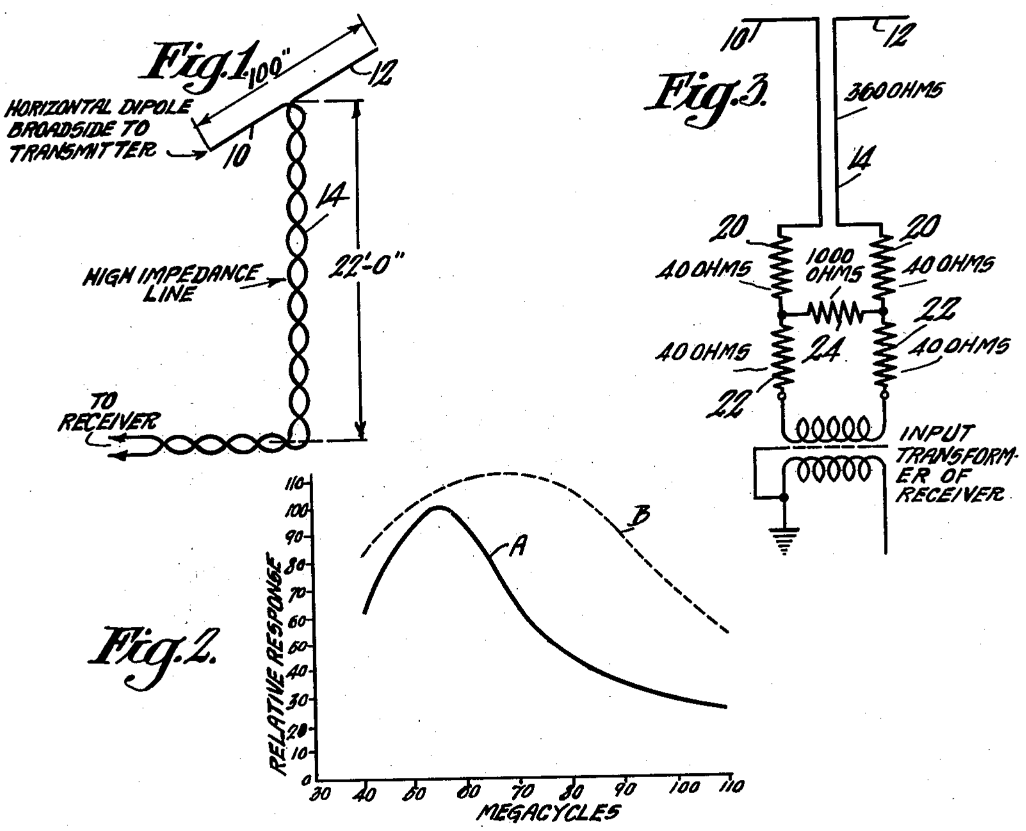
Figure 4:
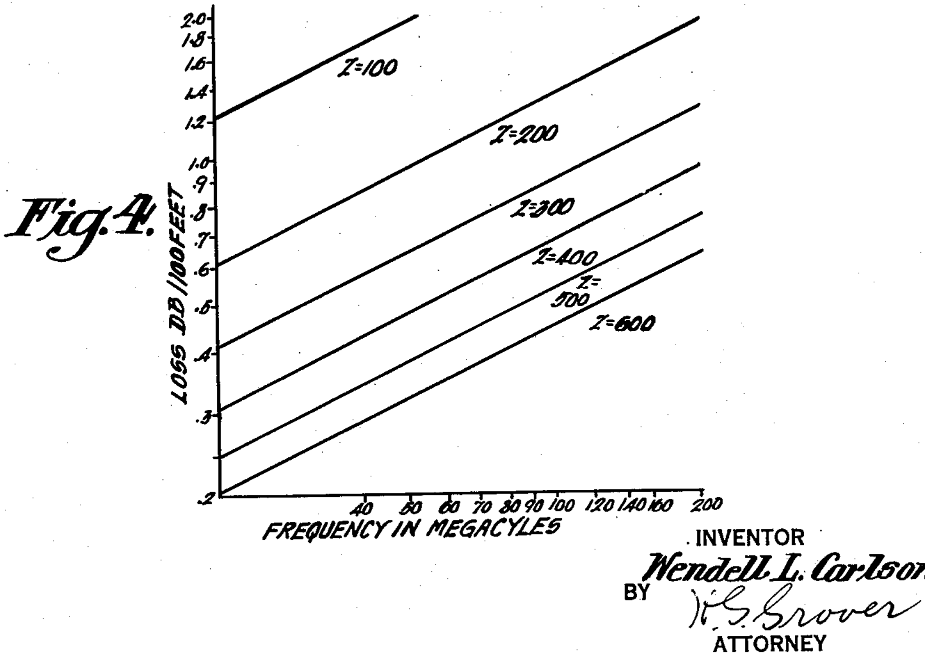

The present invention will be more fully understood by reference to the following detailed description which is accompanied by a drawing in which:

Figure 1 illustrates diagrammatically the application of the principles of the present invention to a television receiving antenna system, while Figure 2 is a family of curves illustrating some of the advantages to be attained by the use of a high impedance transmission line between the television receiving antenna and the receiver, while Figure 3 illustrates in diagrammatic form a type of resistive pad which may be used for coupling the high impedance transmission line to the input transformer of a television receiver, and Figure 4 is a family of curves illustrating, for a group of transmission lines of differing characteristic impedances, the variation in losses as the operating frequency is varied over a band of frequencies.

Referring now to Figure 1 there is shown a simple dipole receiving antenna in the form of a pair of conductors 10 and 12 arranged in an end-to-end relationship. Coupled to the adjacent ends of conductors 10 and 12 is one end of a high impedance transmission line 14. The other ends of the conductors of the transmission line 14 are adapted to be connected to the input terminals of a television receiver. The receiver itself is not shown but its connection is indicated by an appropriate label. The dimensions shown on Figure 1, it should be understood, are merely illustrative and not in any way intended to limit the invention. Now, at the frequency to which the antenna 10, 12 is resonant, the impedance presented to the transmission line 14 at the adjacent ends of conductors 10 and 12 is about 70 ohms. Therefore, most of the transmission lines heretofore used for television receivers have been so constructed as to provide a surge impedance of 70 to 100 ohms. Further, lines having a surge impedance of the order of 70 ohms have been, and are, widely used to connect transmitters to dipole antennas where the chief aim is to radiate a maximum amount of energy at one frequency. Since as before indicated the resonant impedance of a dipole antenna was of the order of 70 ohms, the 70 ohm or 100 ohm transmission line gave the best transfer of power on one frequency. However, the problem of receiving television signals over a number of television bands is an entirely different problem than operating on one frequency. If a half wave dipole is cut to be resonant at 50 megacycles per second and used as an antenna, it may have an impedance of 72 ohms at 50 megacycles, but the impedance may rise to 1,000 or 2,000 ohms at 100 megacycles per second. Likewise the impedance may rise to several hundred ohms at 40 megacycles. Therefore, it will be seen that the antenna's impedance may vary from 70 ohms to 2,000 ohms over a band of television frequencies which it may be desired to receive. It is therefore apparent that a line impedance of 72 ohms is not satisfactory for wide band operation.

If a line is used which has an impedance such as to transfer a maximum amount of energy over all of the television bands, the impedance would have to be the value something less than one half the difference between the lowest and highest values of impedance encountered. The impedance, therefore, determined solely by this consideration would be something on the order of 600 ohms. However, the actual value of optimum impedance is a complex affair, dependent on many things such as the frequency response of the antenna, the type of antenna load, the impedance of the antenna load, the loss characteristics of the transmission line and other factors. For any given set of conditions, an optimum value of line impedance may be determined by a series of field measurements. This value in all cases will be many times higher than 72 ohms, the value of impedance of heretofore used transmission lines.

I have discovered that the line impedance should be reasonably high, preferably between 300 and 600 ohms. Between these limits a higher value is preferable because the line loss decreases as the impedance increases. For example, when the line impedance is doubled, the losses may be cut in half. This is clearly indicated by the curves in Figure 4 where the loss in decibels per 100 feet is plotted against frequency in megacycles per second for a group of transmission lines having impedances varying between 100 and 600 ohms.

The curves in Figure 2 illustrate the relative response of an antenna and transmission line over a band of frequencies. Curve A illustrates the response obtained with a low impedance transmission line connected to the adjacent inner ends of conductors 10 and 12 of the antenna of Figure 1. It will be noted that the maximum of curve A is more or less sharply peaked at a value between 50 and 60 megacycles and drops off rather abruptly thereafter. Substituting a high impedance transmission line curve B is obtained. This curve, it will be apparent, shows a much broader response peak. The antenna system therefore is satisfactorily usable over a much wider band of frequencies than when a low impedance line is used. The improved response shown by curve B compared with curve A is partly due to the lower loss in the transmission line as indicated by the curves in Figure 4 and partly due to a more favorable match between the antenna itself and the line.

While the electrical requirements favor a high value of impedance for the transmission line this cannot in practice be carried too far as the cost per foot of transmission line may increase rather sharply with the increase of line impedance. This is due to the fact that the diameters of the wires may not be decreased indefinitely without making the transmission line too weak to be self supporting. On the other hand, the spacing is limited by the costs of the material used to maintain the wires in a spaced relationship. Furthermore, a widely spaced line becomes unwieldy to handle. A value of between 300 and 600 ohms, and nearer 300 than 600 ohms, is therefore indicated as the best all-around value of line impedance. Since the high impedance transmission line may not directly match the input impedance of the input transformer of a television receiver, it may be necessary to provide an impedance matching structure between the transmission line and the receiver. Without such impedance matching network there might be a loss of signal due to standing waves on the transmission line. Furthermore the standing waves cause ghost images on the received picture.

With a high impedance transmission line such as has been described, the simple resistive pad in Figure 3 may be used. In series between each of the input terminals of the receiver and one of the leads of the transmission line 14 is connected a pair of serially connected resistors 20 and 22. Between the junction points of each of the resistors 20 and 22 is connected shunt resistor 24. If each of the resistors 20 and 22 are given values of 40 ohms and resistor 24 a value of 1,000 ohms, the impedance matching pad results in only a three decibel loss. If desired, an impedance matching pad may additionally be employed between the antenna and transmission line to match the impedance of the antenna to the transmission line. However, ordinarily, it will be necessary to provide only a single pad between the transmission line and the receiver.

What is claimed is:

A broad band antenna system for use with a receiver having input terminals presenting a given input impedance, including a half wave dipole receptor element resonant at some one frequency within said band and having an impedance of substantially 73 ohms at the terminals thereof, a length of transmission line having a characteristic impedance of substantially 360 ohms connected to said receptor element terminals, and a resistance pad connected in series with said transmission line and said receiver terminals, said pad including two series arms each comprising two resistors having a value of substantially 40 ohms and a shunt arm comprising a resistor having a value of substantially 1000 ohms.

WENDELL L. CARLSON.

REFERENCES CITED

The following references are of record in the file of this patent:

UNITED STATES PATENTS

| Number | Name | Date |
|---|---|---|
| Re. 19,854 | Amy | Feb. 18, 1936 |
| 2,049,147 | Wheeler | July 28, 1936 |
| 2,104,610 | Dome | Jan. 4, 1938 |
| 2,110,159 | Landon | Mar. 8, 1938 |
| 2,111,743 | Blumlein | Mar. 22, 1938 |
| 2,117,154 | Dome | May 10, 1938 |
| 2,131,108 | Lindenblad | Sept. 27, 1938 |
| 2,143,159 | Lundahl | Jan. 10, 1939 |
| 2,243,182 | Amy | May 27, 1941 |
| 2,283,914 | Carter | May 26, 1942 |

OTHER REFERENCES

Ware and Reed, "Communication Circuits," by John Wiley, 1942, pages 152 and 153.

Terman, Radio Engineers' Handbook, 1943, page 869.